United States Patent [19]

Ogawa

[11] Patent Number: 4,722,065
[45] Date of Patent: Jan. 26, 1988

[54] ELECTRONICALLY PROGRAMMABLE CALCULATOR WITH MEMORY PACKAGE

[75] Inventor: Kiyoshi Ogawa, Tokyo, Japan
[73] Assignee: Casio Computer Co., Ltd., Tokyo, Japan
[21] Appl. No.: 715,016
[22] Filed: Mar. 22, 1985

[30] Foreign Application Priority Data

Mar. 30, 1984 [JP] Japan .................................. 59-62764
Mar. 30, 1984 [JP] Japan .................................. 59-62765

[51] Int. Cl.$^4$ ............................................ G06F 12/02
[52] U.S. Cl. ................................... 364/709; 364/200
[58] Field of Search ... 364/709, 710, 706, 200 MS File

[56] References Cited

U.S. PATENT DOCUMENTS

| | | | |
|---|---|---|---|
| 3,839,630 | 10/1974 | Olander, Jr. et al. | 364/709 |
| 4,063,221 | 12/1977 | Watson et al. | 364/200 |
| 4,091,446 | 5/1978 | Demonte et al. | 364/706 |
| 4,455,618 | 6/1984 | Walden et al. | 364/900 |
| 4,516,218 | 5/1985 | Hamilton | 364/900 |

FOREIGN PATENT DOCUMENTS

| | | |
|---|---|---|
| 121381 | 10/1984 | European Pat. Off. . |
| 2939461 | 4/1981 | Fed. Rep. of Germany . |
| 2101370 | 1/1983 | United Kingdom . |

OTHER PUBLICATIONS

Hewlett, Packard HP-41C, No. 5952-9712, 4/81, pp. 1-13.

*Primary Examiner*—David H. Malzahn
*Attorney, Agent, or Firm*—Frishauf, Holtz, Goodman & Woodward

[57] ABSTRACT

In an electronically programmable calculator with a memory package, a plurality of memory packages are detachably loaded into a housing. Program data is written in at least one of the plurality of memory packages, and variable data is written in at least one other thereof. The contents of each memory package is always maintained by a built-in battery. The memory packages can be replaced with other memory packages, as needed.

8 Claims, 16 Drawing Figures

F I G. 1
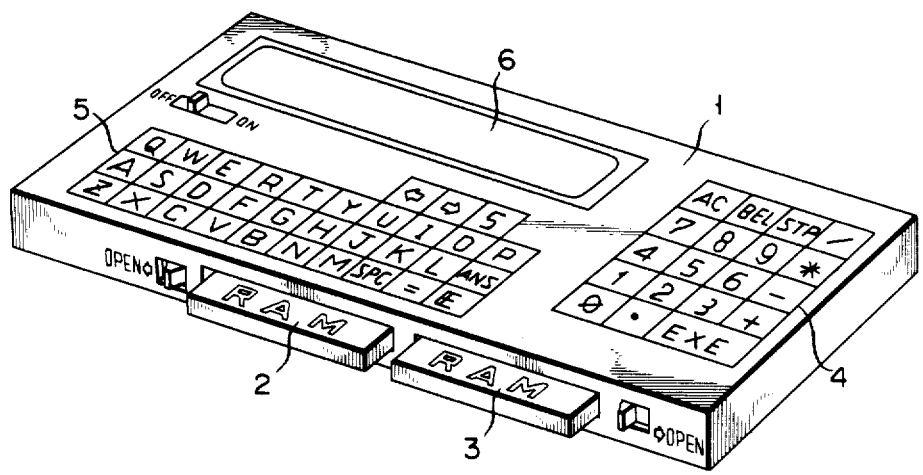
F I G. 2
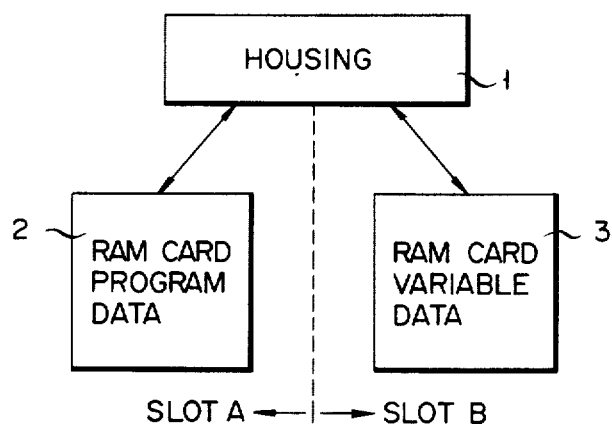

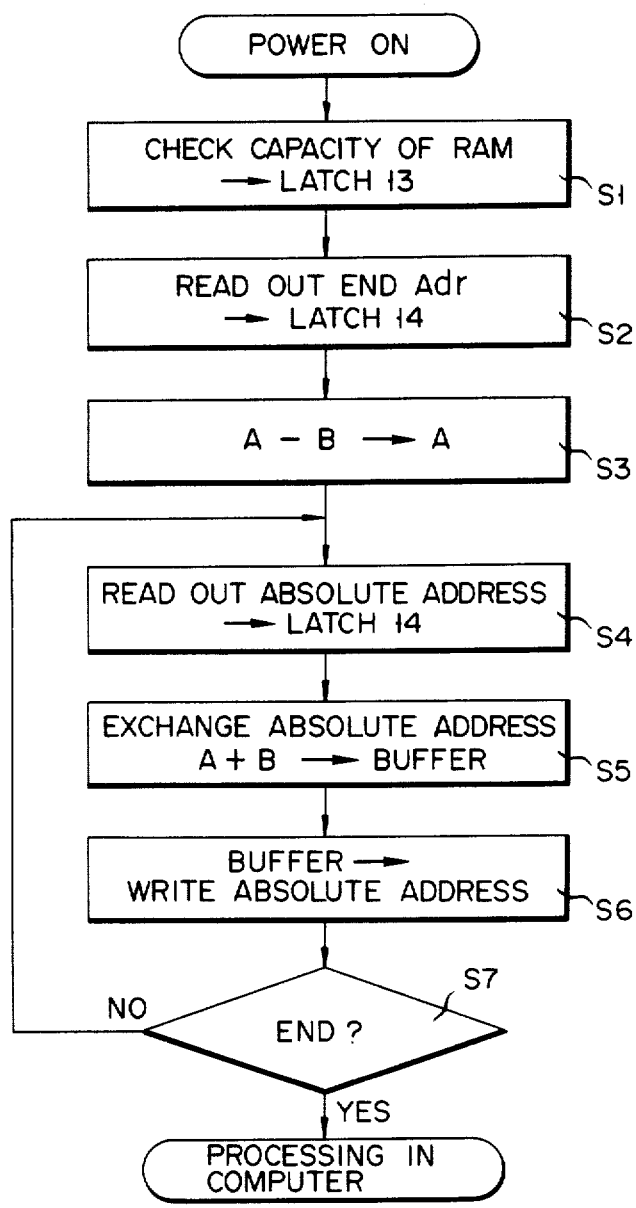

ELECTRONICALLY PROGRAMMABLE CALCULATOR WITH MEMORY PACKAGE

BACKGROUND OF THE INVENTION

The present invention relates to an electronically programmable calculator with a memory package comprising a load/unload mechanism for a plurality of memory packages.

An electronically programmable calculator with a memory package and a load/unload mechanism for a plurality of memory packages, e.g., RAM cards or RAM packages is conventionally known. In this calculator, all the addresses of respective memory areas of the plurality of memory packages loaded into the mechanism are considered as a continuous, single address area, and a program or variable data can be written in the address area.

With an electronically programmable calculator of this type, in the program data setting mode, continuous absolute addresses are assigned to all the memory areas of a plurality of, e.g., loaded RAM cards which are considered as a single address area. For this reason, once a program or variable data is written in the memory area, the calculator can only be used with the RAM card which define the continuously determined data, and cannot be used with RAM cards of different memory capacities. More specifically, for example, one of a pair of RAM cards each having a capacity of 4 kB cannot be replaced with a RAM card having a smaller capacity of 1 kB or 2 kB.

Even though it is determined that the memory content of the memory package is partially erased, the abnormal portion cannot be detected. Therefore, unless all the data, such as a stored program or variable data, is cleared, the calculator cannot be switched to the execution mode, resulting in a time-consuming and ineffective operation.

In calculators requiring no specific type of operator, even though the memory packages are not loaded or are mis-loaded, a means for signalling a malfunction is not provided as in the above case, resulting in inconvenience. In addition, since the calculator cannot be switched to the execution mode, it lacks reliability. For this reason, strong demand has arisen for development of a mechanism for checking if the memory packages are correctly loaded or storage contents are normal.

SUMMARY OF THE INVENTION

The present invention has been made in consideration of the above situation, and has as its object to provide an electronically programmable calculator with a memory package wherein a plurality of memory packages having different capacities can be desirably replaced, and storing states in the memory packages can be easily checked so as to clearly signal an abnormality.

In order to achieve the above object, there is provided a electronically programmable calculator with a memory package, comprising: a plurality of memory package means; housing means from which said plurality of memory package means are independently detachable; data processing means electrically connected to said plurality of memory package means loaded into said housing means; and input means, connected to said data processing means, for inputting program and variable data in said plurality of memory package means; said data processing means including at least select means for selecting at least one memory package of said plurality of memory package means for storing the program data and at least one other memory package thereof for storing the variable data, and means for storing the program and variable data input by said input means into the memory package selected by said select means. With this arrangement, the electronically programmable calculator with a memory package can replace memory packages of different capacities, and a range of possible combinations of memory packages can be widened. In addition, a memory package of a desired capacity can be selected in correspondence to the memory area used, thus effectively utilizing the memory packages. Furthermore, the loading and storing states of the memory packages can be clearly signaled to the operator, and detection of an abnormality can be easily and quickly performed, thus reducing the work load of the operator.

BRIEF DESCRIPTION OF THE DRAWINGS

FIG. 1 is a perspective view showing an electronically programmable calculator with a memory package according to an embodiment of the present invention;

FIG. 2 is a schematic view showing a state wherein two memory packages are loaded in a housing of the electronic program calculator of the present invention;

FIG. 7 is a flow chart for explaining the operation of the circuit, shown in FIG. 5;

DETAIL DESCRIPTION OF THE REFERRED EMBODIMENT

Figure 3:
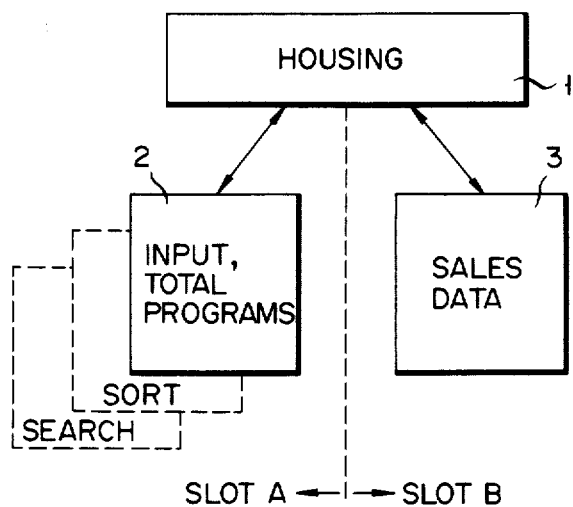
FIG. 3 is a schematic view showing an example wherein data set in one of the two memory packages shown in FIG. 2 is processed so as to be replaceable with various programs set in the other memory package.

An embodiment of the present invention will be described with reference to the accompanying drawings.

FIG. 1 shows a state wherein a pair of, e.g., RAM cards 2 and 3 are loaded in a housing 1 of an electronically programmable calculator with a memory package according to the embodiment of the present invention. The housing 1 is provided with a digit key unit 4, a character key unit 5 and a display unit 6. The calculator uses the pair of RAM cards as shown in FIGS. 2 to 4.

FIG. 2 shows an example in which program data is stored in one RAM card 2 and variable data is stored in the other RAM card 3. These RAM cards 2 and 3 are loaded in different slots A and B of the housing 1.

Referring to FIG. 3, a plurality of replaceable RAM cards for storing, e.g., an input program, a total program, a sort program, a search program or the like are used as one RAM card 2. The other RAM card 3 stores particular sales data. Sales analysis of the particular sales data can be performed in accordance with the above programs.

Figure 4:
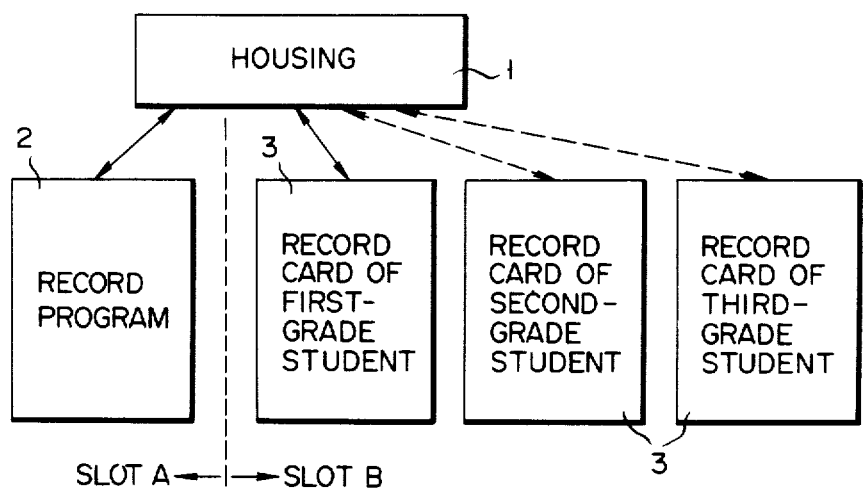
FIG. 4 is a schematic view showing an example wherein one program set in one of the two memory packages shown in FIG. 2 is processed so as to be replaceable with a number of data set in the other memory package.

Referring to FIG. 4, one RAM card 2 stores a record program. On the other hand, a plurality of replaceable RAM cards for respectively storing data of the records of first-, second-, third-grade students are loaded as one RAM card 3. In this manner, a number of data can be processed with respect to a single particular program.

The configuration of the electronically programmable calculator having a memory package structure into which the RAM cards 2 and 3 as described above can be loaded will be described hereinafter with reference to FIG. 5.

Figure 5:
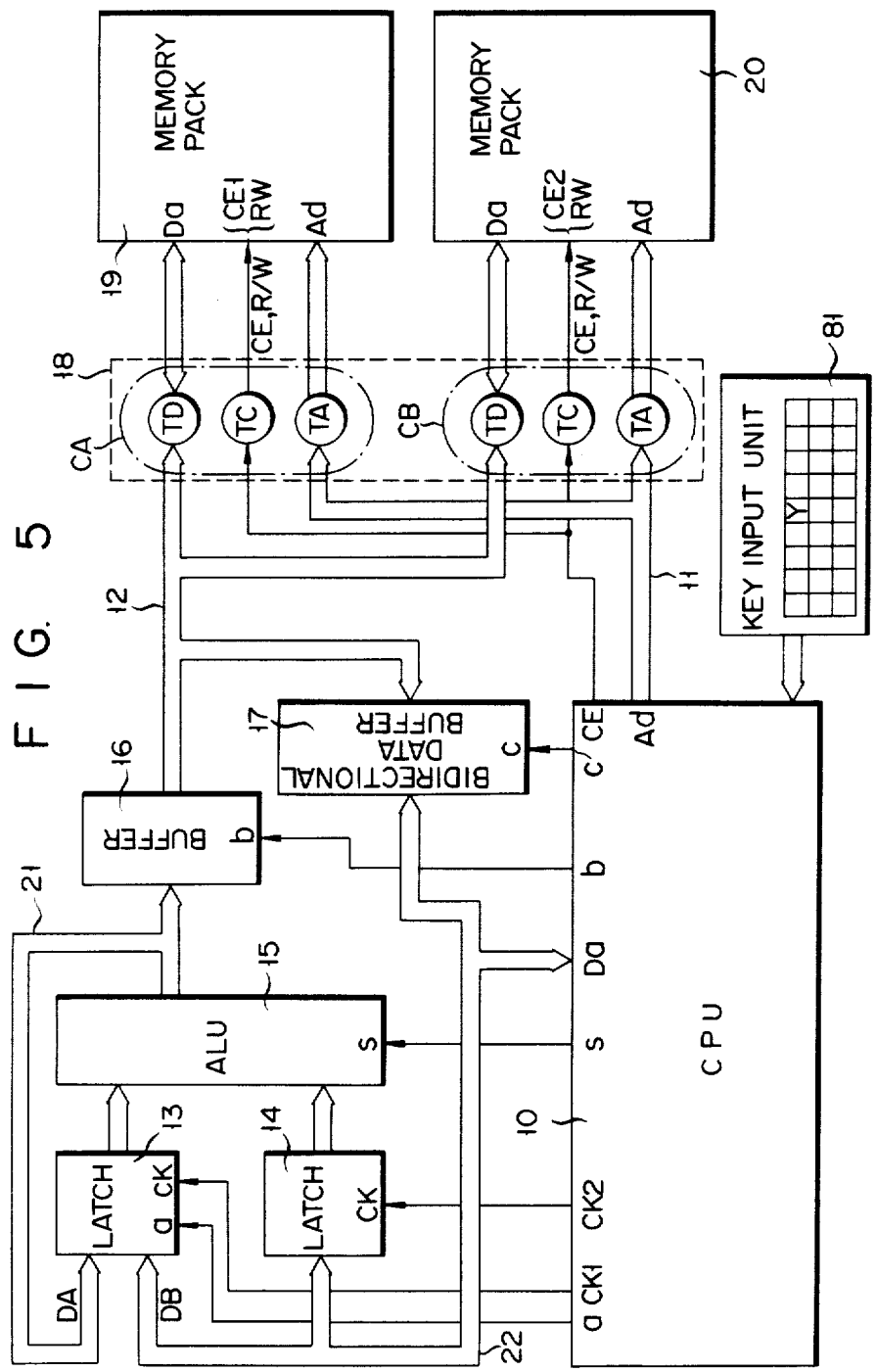
FIG. 5 is a block circuit diagram showing a main part of a circuit configuration according to the embodiment of the present invention.

Referring to FIG. 5, reference numeral 10 denotes a CPU for performing overall control of the calculator. The CPU 10 executes processing in accordance with a set program of the RAM card loaded in a RAM card load/unload mechanism (to be described later) under the control of a microprogram. In this embodiment, the CPU 10 has a specific firmware mechanism for performing a checking operation of the RAM cards (to be described later) and a rewriting operation thereof when the calculator is powered (in the initialization control mode).

Reference numeral 11 denotes an address bus for transferring address data to the RAM cards; and 12, a data bus for tranferring read/write data.

Reference numeral 13 denotes a latch, having a selective output function, for latching data on data lines 21 and 22 (DA/DB) in response to a control signal (ck1) from the CPU 10 and for selectively generating data (DA) or (DB) in response to a control signal (a) from the CPU 10. Note that when the control signal (a) is "1", the latch 13 generates the data (DA) received through the data line 21, and when "0", it generates the data (DB) received through the data line 22.

Reference numeral 14 denotes a latch for latching data on the data line 22 in response to a control signal (ck2) from the CPU 10.

Reference numeral 15 denotes an arithmetic and logic unit (ALU) for receiving data from the latches 13 and 14 as calculated data so as to perform a calculation in accordance with a control signal (s) from the CPU 10. It should be noted that the ALU is switched to the subtraction mode when the control signal (s) is "1", and to the addition mode when it is "0".

Reference numeral 16 denotes a data buffer for accumulating output data from the ALU 15. When the buffer 16 receives a "1" control signal (b) from the CPU 10, it generates data. Reference numeral 17 denotes a bidirectional data buffer for accumulating data on the data bus 12 or the data line 22. The output direction of the buffer 17 is switched by a control signal (c) from the CPU 10. In this embodiment, when the control signal (c) is "1", the buffer 17 generates data on the data bus 12, and when "0", it generates data on the data line 22.

Reference numeral 18 denotes a connector unit for loading/unloading RAM cards as a load/unload mechanism for memory packages. In this case, the connector unit 18 comprises connectors CA and CB for connecting a pair of RAM cards. Each of the connectors CA and CB comprises data and address terminals TD and TA and a terminal TC for supplying a chip enable signal (CE) and a read/write signal (R/W).

Reference numerals 19 and 20 denote card-like memory packages respectively each having as a memory element a RAM (random-access memory) which is backed up by a power supply therein (to be referred to as a RAM card hereinafter). The RAM cards have different capacities, e.g., 4 kB (A), 2 kB (B), 1 kB (C) and can be used at the same time. The RAM cards 19 and 20 are connected to the connectors CA and CB of the connector unit 18 and are selectively designated by the chip enable signal CE. Reference numeral 81 denotes a key input unit.

Figure 6A:
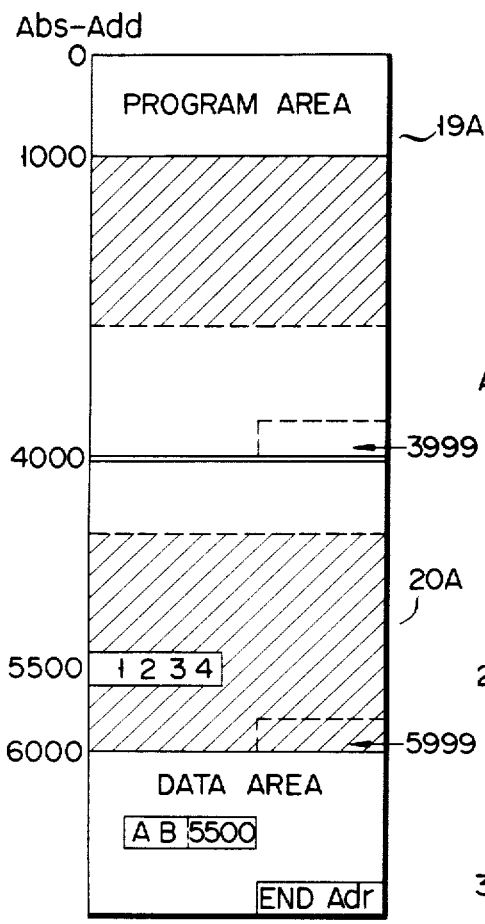
FIGS. 6(a) and 6(b) are respectively memory RAM cards before and after replacement according to the embodiment of the present invention.
Figure 6B:
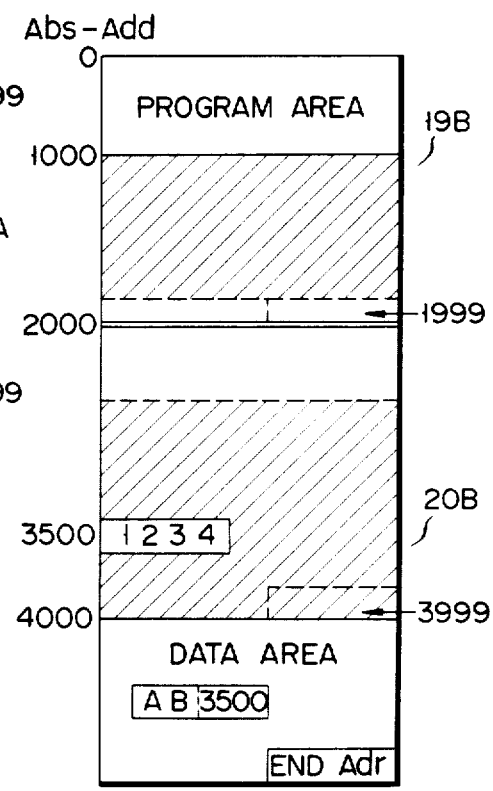

FIGS. 6(a) and 6(b) are views for explaining the above embodiment. FIG. 6(a) shows a memory map when the 4-kB memory packs 19A and 20A are respectively loaded into the connectors CA and CB of the connector unit 18. FIG. 6(b) shows a memory map when the 2-kB memory pack 19B is loaded into the connector CA and the 4-kB memory pack 20A is loaded into the connector CB. When the RAM cards 19 and 20 are connected to the connectors CA and CB of the connector unit 18, one, e.g., the card 19, is used as a program card in which program data is written, and the other, i.e., the card 20, is used as a variable data card in which variable data is written. FIG. 7 shows the operation flow of memory check processing executed under the control of the CPU 10 when the calculator is powered.

Operation of the calculator according to the embodiment will be described with reference to FIGS. 5 to 7. In this case, an example will be described wherein the program card, i.e., the memory pack 19A of the program and data cards set by using the 4-kB memory packs 19A and 20A is replaced with the 2-kB memory pack 19B. FIGS. 6(a) and 6(b) specifically show this example. FIG. 6(a) shows address assigning and storing states of the program and data cards constituted by the 4-kB memory packs 19A and 20A. Reference symbol Abs-Add denotes absolute addresses continuously assigned to the respective cards. A hatched portion of the RAM card 19A (program card) is an area in which a program is already written, and that of the memory pack 20A (data card) is an area in which data is already written. Reference symbol END-Adr denotes an end address of all the memory areas (in this case, 7999); AB, a variable name; "5500", a corresponding absolute address (i.e., the variable name AB = "1234"). A rewriting operation will be described hereinafter when the memory pack 19A, as the program card of a pair of program and data cards, is replaced with the 2-kB memory pack 19B shown in FIG. 6(b).

When the calculator is powered, the capacities of the RAM cards loaded to the connector unit 18 are respectively checked under the control of the fixed microprogram of the CPU 10. In this case, since only 4-kB, 2-kB and 1-kB memory packs can be used, the capacities are checked by reading/writing data while adding addresses in units of 1 kB. Various capacity checking operations can be used. However, in this case, the capacity checking operation in units of 1 kB is performed in the order of addresses 0, 999, 1000, 1999, 2000, 2999, . . . . End address data representing the capacity determined by this checking operation is latched in the latch 13 (step S1 of FIG. 7). The 2-kB memory pack 19B is loaded into the connector CA as the program card in place of the memory pack 19A, and the memory pack 20A which has been combined with the RAM card 19A is loaded into the connector CB as the data card. Thus, the overall capacity of the calculator is 6 kB, and therefore, data "5999" representing the end address thereof is latched by the latch 13.

Next, data representing the end address (END-Adr) of the RAM card combination stored at a specific address of the RAM card 20A before replacement is read out and is latched by the latch 14 (step S2 of FIG. 7). In this case, the previous capacity is 8 kB, and therefore, data "7999" representing the end address thereof is latched by the latch 14.

A difference between the current and previous capacities is obtained by comparing the data (the end address data "5999" corresonding to the current capacity) latched in the latch 13 and the data (the end address data "7999" corresponding to the previous capacity). The CPU 10 supplies a "0" control signal (a) so that the data "5999" accumulated in the latch 13 is supplied to the ALU 15 together with the data "7999" accumulated in the latch 14. Then, the CPU 10 supplies a "1" control signal (s) so as to obtain a difference between the current and previous capacities. In this case, −"2000" is obtained as the difference between the capacities. The difference data obtained from this calculation is latched by the latch 13 in accordance with the control signal (ck1) from the CPU 10 (step S3 of FIG. 7).

The CPU 10 reads the absolute address areas of the RAM card 20A loaded into the connector CB, and the readout absolute address data is latched by the latch 14. After transferring read address data on the address bus 11, the CPU 10 supplies the "0" control signals (b) and (c) and generates the control signal (ck2), thereby latching the absolute address data read out from the RAM card 20A in the latch 14 through the data buffer 17 (step S4 of FIG. 7).

The CPU 10 supplies the "0" control signals (a) and (s) so as to switch the ALU 15 to the addition mode. The CPU 10 causes the ALU 15 to correct the absolute address stored in the latch 14 with the difference data of the capacities stored in the latch 13. The corrected absolute data is stored in the data buffer 16 (step S5 of FIG. 7).

Furthermore, the CPU 10 generates the "1" control signal (b) and "0" control signal (c) so as to generate the corrected absolute address data stored in the data buffer 16 on the data bus 12. Simultaneously, the CPU 10 supplies the read/write signal (R/W) representing a write mode and the same address data as that in the read mode so as to rewrite the corrected absolute address to the read address of the RAM card 20A (step S6 of FIG. 7). For example, as shown in FIGS. 6(a) and 6(b), the absolute address of the variable name AB="1234" is rewritten from "5500" to "3500".

In this manner, when one absolute address is written, it is checked if the absolute address to be written is present (step S7 of FIG. 7). The above processing is repeated until no absolute addresses to be written are present, i.e., all the absolute addresses of the memory pack 20A are rewritten.

As described above, when the calculator is powered, the capacities of the memory packs 19 and 20 loaded into the connector unit 18 are checked and rewriting processing of the absolute addresses is performed in accordance with a change in the capacities. For this reason, RAM cards of different capacities can be desirably combined, and a desirable card can be selected in accordance with the setting of the data amount, thereby effectively using RAM cards. Since the rewriting operation of absolute addresses is performed when the calculator is powered, address assignment can be performed using the absolute addresses when a calculation is performed. Therefore, calculation speed is not adversely influenced.

Another embodiment in which a circuit for detecting an abnormality is added to the electronic program calculator shown in FIG. 1 according to the above embodiment will be described with rererence to FIG. 8(a) and 8(b).

Figure 8A:
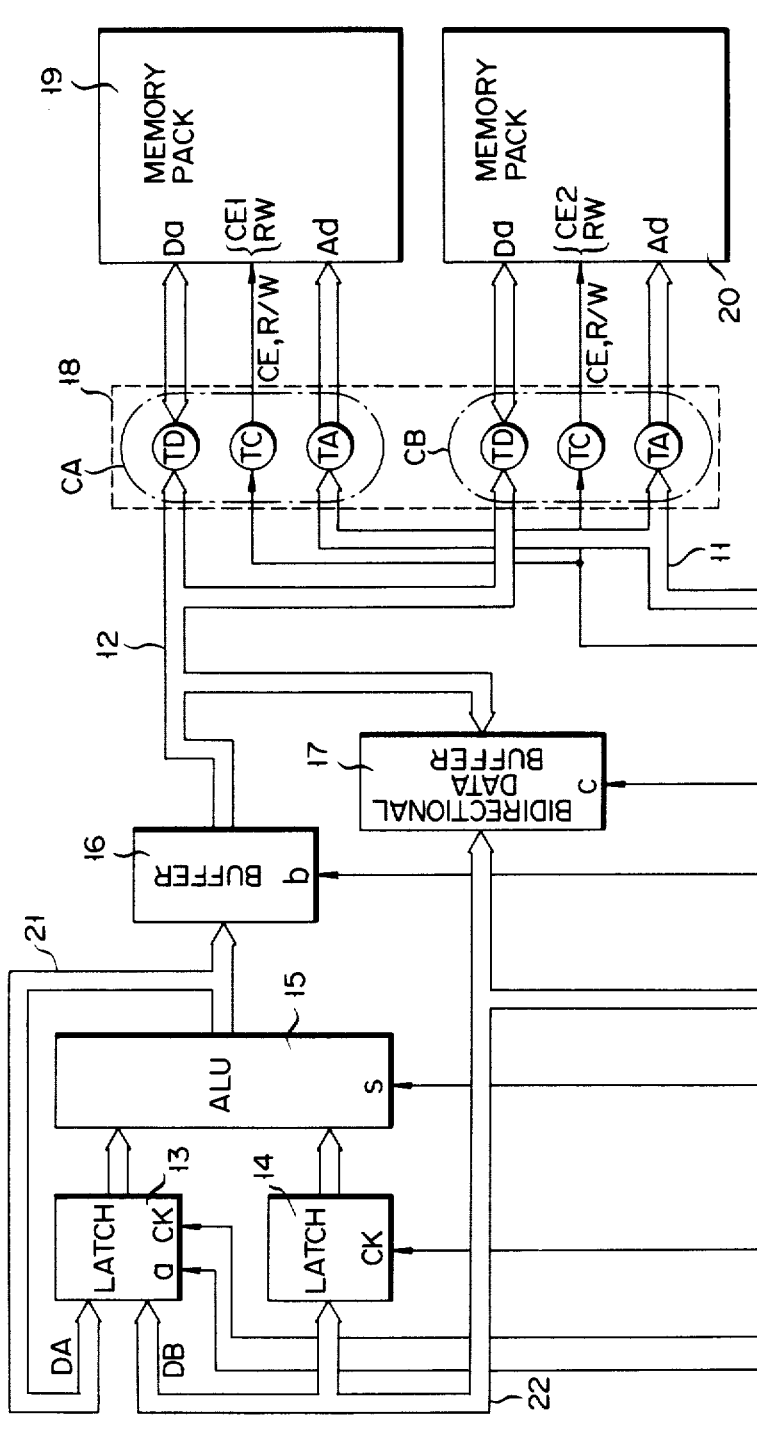
FIGS. 8(a) and 8(b) are a block cirrcuit diagram of another embodiment of the present invention in which an abnormality check circuit is added to the circuit shown in FIG. 5.
Figure 8B:
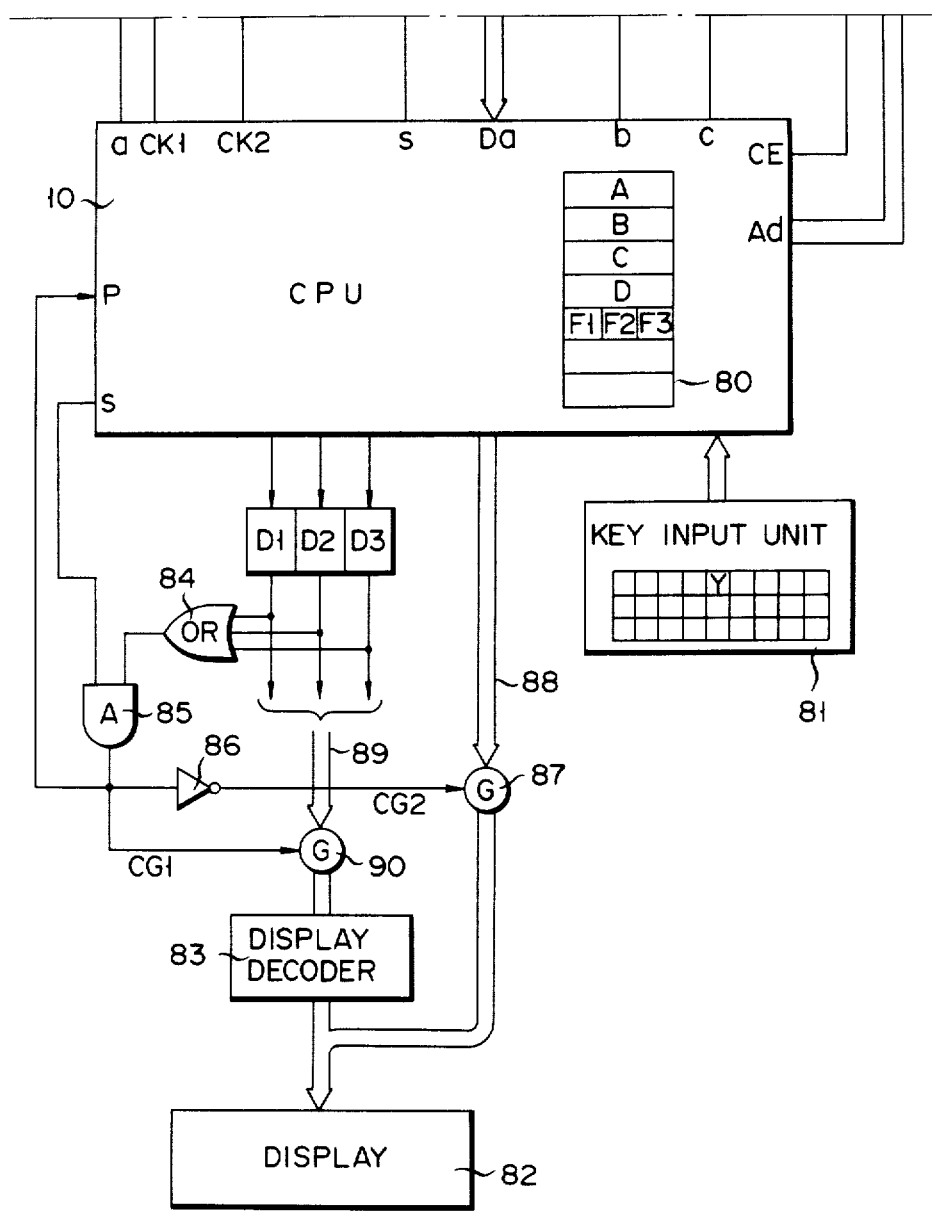

Note that the same reference numerals as in FIG. 1 denote the same parts in FIGS. 8(a) and 8(b), and a detailed description thereof is omitted.

Referring to FIG. 8(b), reference numeral 80 denotes an internal RAM of the CPU 10. Reference symbols A, B, C and D denote registers for internal processing subjected to the checking operation of the RAM cards; and F1, F2 and F3, flip-flops. In this case, the RAM card 19 is used as the program card, and the RAM card 20 is used as the data card. Reference numeral 81 denotes a key input unit; 82, a character display unit; and 83, a display decoder. Reference symbols D1, D2 and D3 denote flip-flops for controlling the abnormality display corresponding to the flip-flops F1, F2 and F3. Reference numeral 84 denotes an OR circuit for obtaining a detection signal representing the presence/absence of the RAM card abnormality display from the outputs from the flip-flops D1, D2 and D3; 85, an AND circuit for generating a gate control signal (CG1) in response to a abnormality display timing signal (S) from the CPU 10 and an output signal from the OR circuit 84; and 86, an inverter for obtaining an inverted output signal of the AND circuit 86, e.g., an inverted gate control signal (CG2). Reference numeral 87 denotes a transfer gate circuit which is inserted in a normal display data transfer path 88 and is enabled by the gate control signal of "1" level (CG2="1") from the inverter 86. Reference numeral 90 denotes a transfer gate circuit which is inserted in an abnormality display data transfer path 89 between the flip-flops D1, D2 and D3 and the display decoder 83, and is enabled by the gate control signal of "1" level (CG1="1"), representing an abnormal state, from the AND circuit 85. An output from the AND circuit 85 is supplied to the CPU 10 so that the calculator is switched to the execution mode after performing abnormality display. That is, the output from the circuit 85 is supplied to the CPU 10 as a determination signal (P) for checking if the calculator can be switched to the execution mode.

Figure 9:
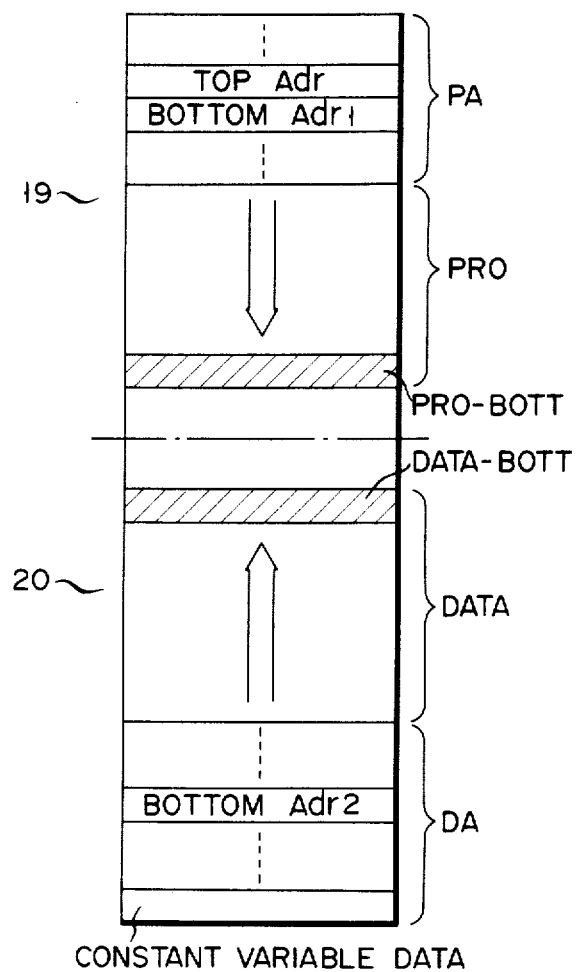
FIG. 9 is a memory map of a memory package shown in FIG. 8.

FIG. 9 shows memory maps of the RAM cards 19 and 20 as the program and data cards loaded into a memory package load/unload mechanism (CN). In FIG. 9, reference symbol PA denotes a program administration area; PRO, a program area; DATA, a data area; DA, a data administration area; PRO-BOTT, a program bottom shown by the program administration area PA; and DATA-BOTT, a data bottom shown by the data administation area DA.

FIGS. 10 to 13 show processing flows in the RAM card checking mode in the above embodiment.

FIGS. 13(a) to 13(e) show display states on the display unit 82 in the RAM card checking mode in the above embodiment.

Figure 10A:
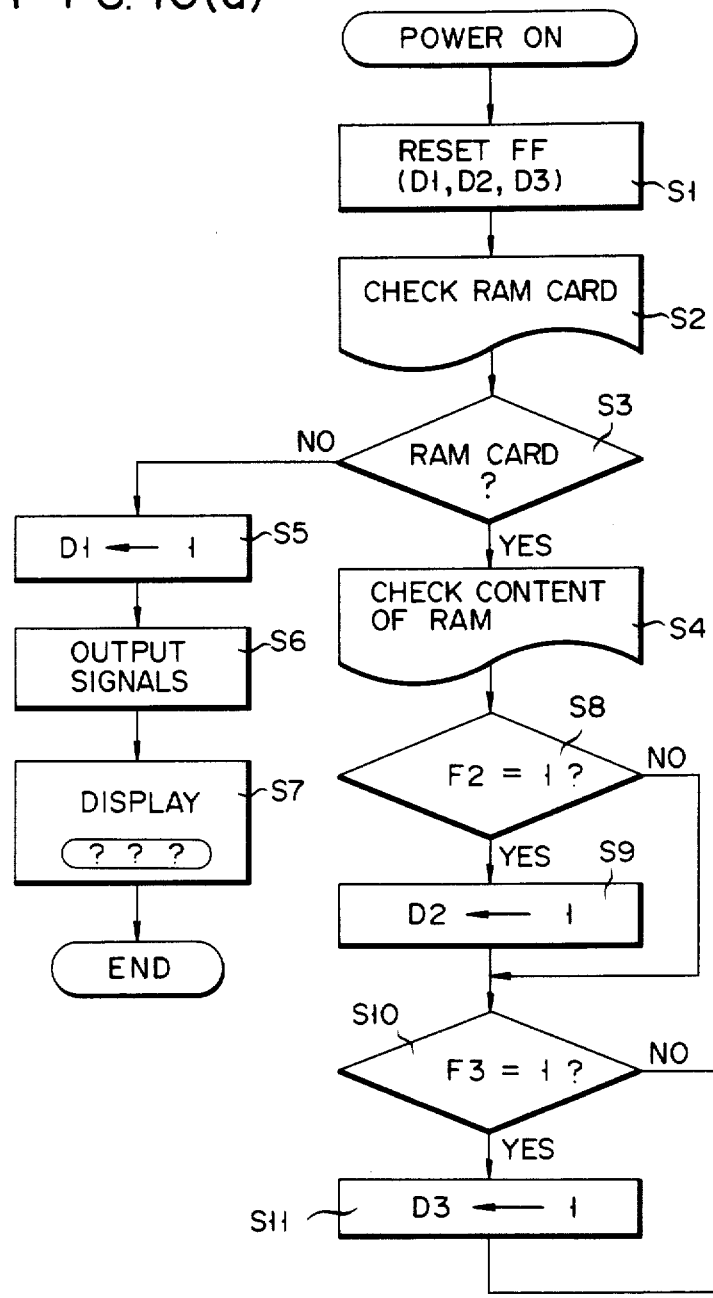
FIGS. 10(a), 10(b), 11 and 12 are processing flow charts for explaining the check operation of the circuit shown in FIG. 8.
Figure 10B:
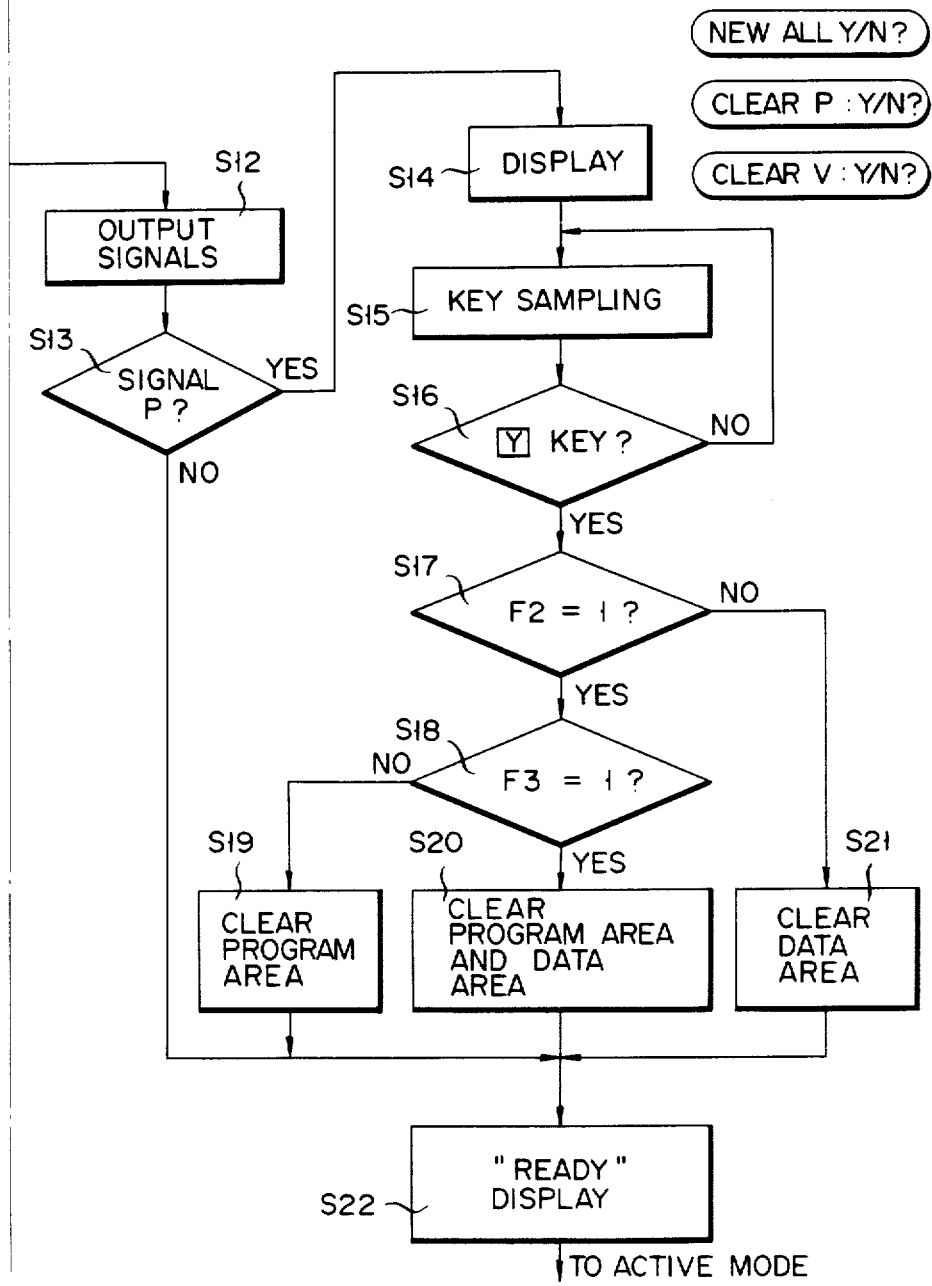

Operation of the above embodiment will be described with reference to FIGS. 8 to 11. When the calculator is powered, the CPU 10 executes the following memory check processing under the control of the internal fixed microprogram thereof:

(1) After resetting ("0") the flip-flops D1, D2 and D3 for controlling the abnormality display in response to a power-on signal, the CPU 10 checks if the RAM cards are loaded (steps S1, S2 of FIG. 10).

(2) Loading of the RAM cards is detected by actually reading/writing data. First, the CPU 10 reads out data in area Top-Adr of the RAM card, and sets the readout data in the register A in the internal RAM 80 (step A1 of FIG. 11).

Figure 11:
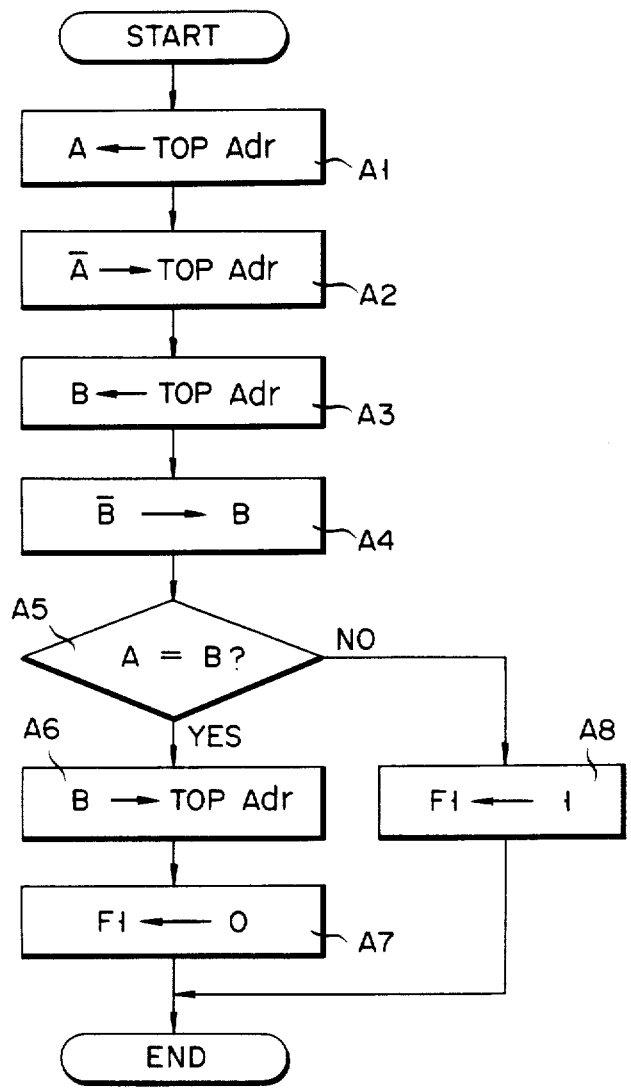

(3) The CPU 10 inverts the data in the register A in the RAM 80, and writes the inverted data in the RAM card again (step A2 of FIG. 11).

(4) The CPU 10 reads out the data written in Top-Adr in (3) again, and inverts the data so as to set it in the register B in the RAM 80 (steps A3, A4 of FIG. 11).

(5) The CPU 10 compares a content of the register A and that of the register B, and when they coincide, i.e., "A=B", the CPU 10 determines that the RAM card is loaded (in the correct loading state), and when they do not coincide, i.e., "A≠B", it determines that no RAM card is loaded (the RAM card is incorrectly loaded) (step A5 of FIG. 11).

(6) If YES in step A5, the CPU 10 writes the content of the register B (Top-Adr) in the RAM card 19 again, and writes "0" in the flip-flop F1 in the RAM 80 (steps A6, A7 of FIG. 11).

On the other hand, if NO in step A5, the CPU 10 writes "1" in the flip-flop F1 (step A8 of FIG. 11).

Figure 12:
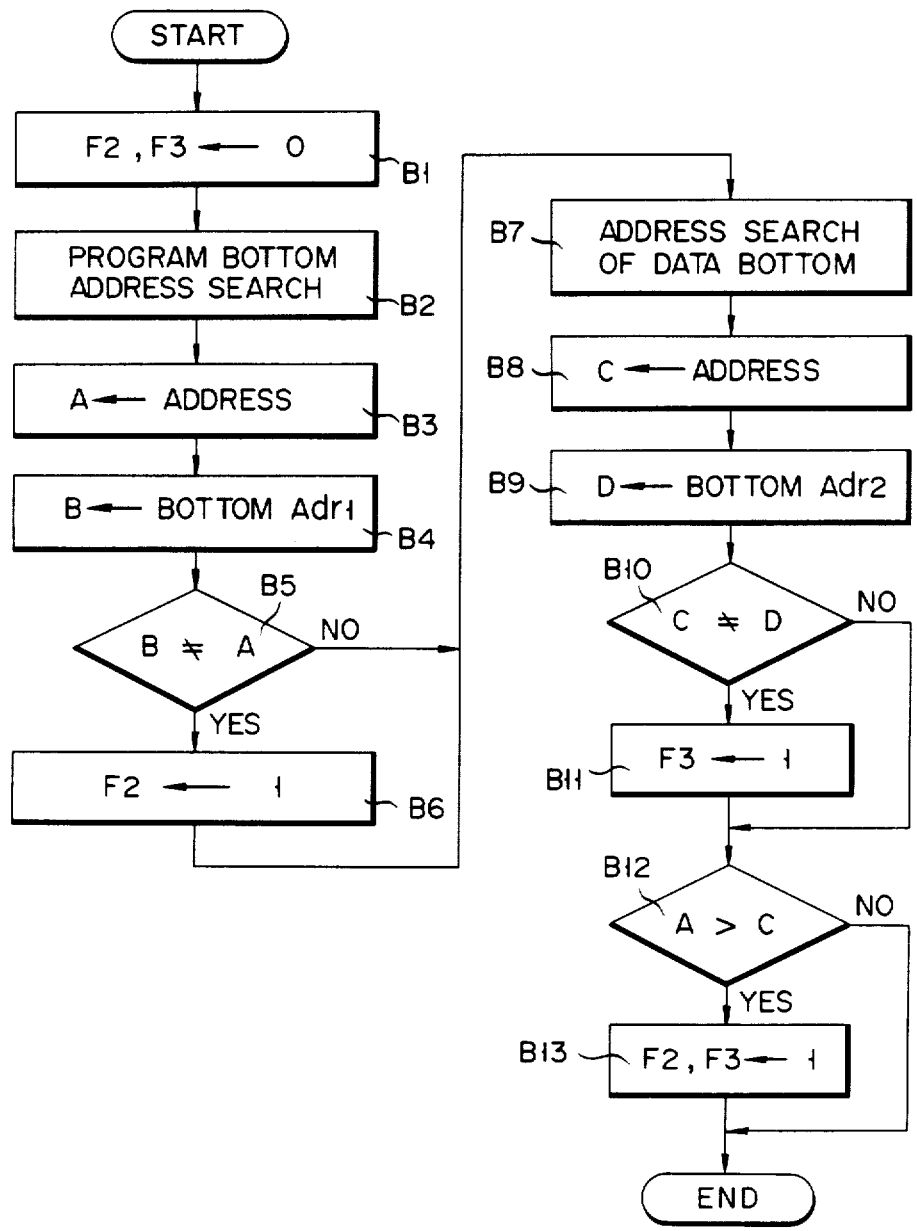
Figure 13:
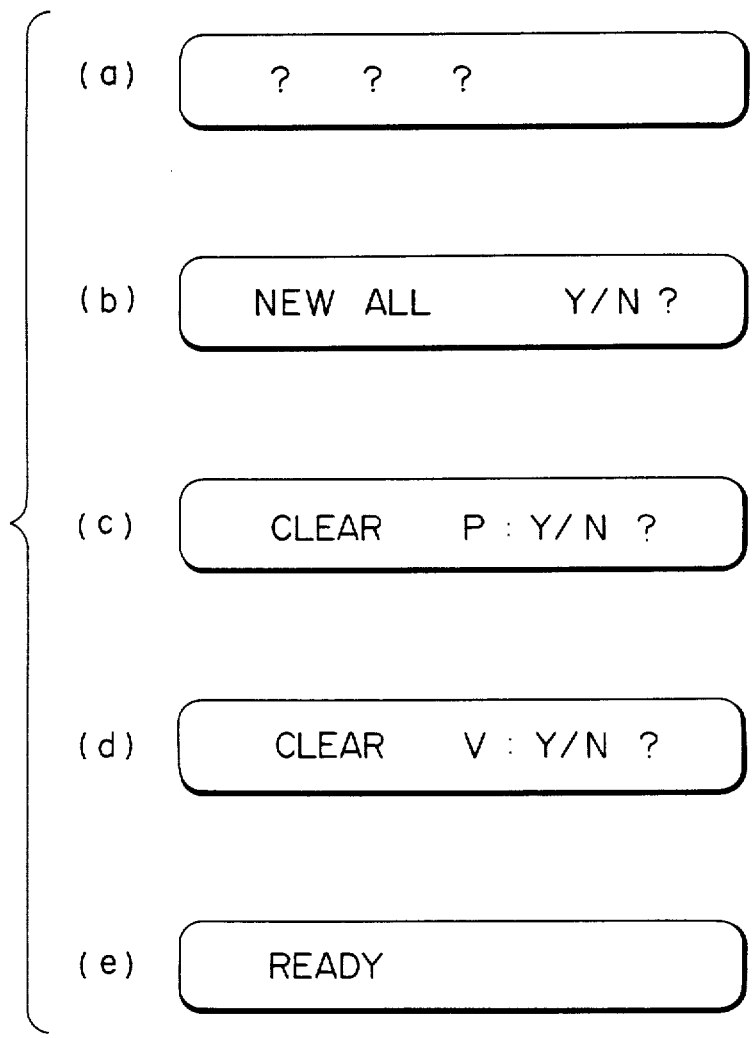
FIG. 13 shows display states on a display unit for displaying an abnormality detection result.

(7) When the flip-flop F1 is "0" representing that the RAM card is loaded (F1="0"), the flow is shifted to a check flow of the RAM card shown in FIG. 12 (steps S3, S4 of FIG. 10).

On the other hand, when the flip-flop F1 is "1" representing that the RAM card is not loaded (F1="1"), the CPU 10 writes "1" in the flip-flop D1 so as to generate the abnormality display timing signal (S="1") (steps S5, S6 of FIG. 10).

In this case, the gate control signal (CG1="1") for abnormality display is generated from the AND gate 85, thereby enabling the transfer gate circuit 90. Thus, 3-bit abnormality display data ("100") generated from the flip-flops D1, D2 and D3 is supplied to the display decoder 83 through the data transfer path 89, thus displaying an abnormality display message in accordance with the decoder output on the display unit 82 (step S7 of FIG. 10).

Fig. 13(a) shows the abnormality display message of no RAM card displayed on the display unit 82 in this case.

(8) The checking operation of the RAM card when the RAM card is loaded (F1="0") is performed as follows. After setting "0" in the flip-flop F1 of the RAM 80, the RAM card 19 is checked. In other words, an address of the program bottom (PRO-BOTT) of the RAM card 19 as the program card is searched, and the searched address is set in the register A in the RAM 80 (step B1, B2, B3 of FIG. 12).

(9) The bottom address (BOTTOM Adr) is read out from the program administration area (PA) of the RAM card 19 and is stored in the register B in the RAM 80 (step B4 of FIG. 12).

(10) The contents of the registers A and B are compared with each other, and when they coincide (A=B), it is determined that the program card, i.e., the RAM card 19 is normal, and the flow advances to the checking flow of the data card (steps B5, B7 of FIG. 12).

On the other hand, when the content of the register A does not coincide with that of the register B(A≠B), "1" is set in the flip-flop F2 in the RAM 80 so as to internally display an abnormality of the program portion, and thereafter the flow advances to the data card checking flow (steps B6, B7 of FIG. 12).

(11) The checking operation of the data card is performed in such a manner that an address of the data bottom (DATA-BOTT) of the RAM card 20 as the data card is searched and the address is set in the register C in the RAM 80 (steps B7, B8 of FIG. 12).

(12) The bottom address (BOTTOM Adr) is read out from the data administration area (DA) of the RAM card 20 and is set in the register D in the RAM 80 (step B9 of FIG. 12).

(13) The contents of the registers C and D are compared with each other, and when they coincide (C=D), it is determined that the data card, i.e., the RAM card 20 is normal. Then, the contents of the registers A and C are compared with each other, and it is checked if the program bottom is larger than the data bottom, that is, if the setting of the program and data is abnormal. When normal, i.e., "A<C", the checking operation of the RAM cards ends (steps B10, B12 of FIG. 12).

When the content of the register C does not coincide with that of the register D (C≠D), it is determined that the data card, i.e., the RAM card 20 is abnormal. "1" is set in the flip-flop F3 in the RAM 80 and thereafter the comparison between the registers A and C is performed (steps B10, B11, B12, ... of FIG. 12).

From the comparison between the registers A and C, when "A>C" is established, i.e., it is determined that the program and data are abnormally set, the flip-flops F2 and F3 in the RAM 80 are set at "1", and the checking operation of the RAM cards ends (steps B12, B13 of FIG. 12).

(14) When the above-mentioned checking operation shown in Fig., 12 of the RAM cards ends, the flow shifts to the display processing of the checked contents.

It is checked if the content of the flip-flop F2 is so, and if "1", "1" is written in the flip-flop D2 for controlling abnormality display (steps S8, S9 of FIG. 10).

(15) It is checked if the content of the flip-flop F3 in the RAM 80 is so and if "1", "1" is written in the flip-flop D3 (steps S10, S11 of FIG. 10).

(16) Thereafter, the abnormality display timing signal (S="1") is generated (step S12 of FIG. 10).

The signal (S="1") is supplied to the AND circuit 85 together with the output signal from the OR circuit 84 receiving the outputs from the flip-flops D1, D2 and D3, and the output from the AND circuit 85 is supplied to the CPU 10 as the determination signal (P) and is also supplied to the gate circuits 87 and 90 as the gate control signal (CG1 or CG2) so as to selectively enable one of them.

(17) When the determination signal (P) which is received immediately after generating the signal (S="1") is "0", the CPU 10 determines that the loaded RAM cards 19 and 20 are normal, and generates display data representing that execution of the processing can start on the normal display data transfer path 88. In this case, since the gate control signal (CG2) is "1"40 (CG="1") and the transfer gate circuit 88 is enabled, the display data generated by the CPU 10 is supplied to the display decoder 83. In accordance with the decoder output, the display unit 82 displays a display message representing that the execution mode can start (steps S13, S22 of FIG. 10).

FIG. 13(e) shows the display message displayed on the display unit 82 in this case.

When at least one of the flip-flops D1, D2 and D3 generates the "1" signal, the gate control signal (CG1="1") for abnormality display is generated from the AND circuit 85, thereby enabling the transfer gate circuit 90. Thus, the 3-bit check display data generated from the flip-flops D1, D2 and D3 is supplied to the display decoder 83 through the data transfer path 89, and the check display is performed on the display unit 82 in accordance with the decoder output (steps S13, S14 of FIG. 10).

When the 3-bit check display data received by the display decoder 83 is "010" (D1 and D3="0", D2="1"), the message shown in FIG. 13(c) representing abnormality of the program portion and asking if it can be cleared is produced. When the data is "001" (D1 and D2="0", D3="1"), the message shown in FIG. 13(d) representing the abnormality of the variable data portion and asking if it can be cleared is produced. When the data is "011" (D1="0", D2 and D3="1"), the message shown in FIG. 13(b) representing abnormality of both the program and data portions and asking if they can be cleared is produced.

(18) When a specific key input (Y) designating clearing is made from the key input unit 81 in accordance with the display content, if the flip-flop F2 in the RAM 80 is "1", the data area of the RAM card 20 is cleared, and if the flip-flop F3 is "1", the program area of the RAM card 19 is cleared. When both the flip-flops F2 and F3 are "1", both the data and program areas are cleared (steps S15, S16, . . . S22 of FIG. 10).

After clearing the memory, the display message shown in FIG. 13(e) representing that the execution mode can start is displayed (step S22 of FIG. 10).

Note that in the above embodiment, when the calculator is powered, the checking operation of the RAM cards is automatically performed. However, the present invention is not limited to this. For example, the checking operation can be manually performed when a specific key is operated.

The check mechanisms for the loading state of the RAM cards and those for the program and variable data portions are not limited to the above embodiment, but can be any configuration which can check the states of the respective portions.

What is claimed is:

1. An electronic programmable calculator comprising:
   a plurality of memory package means, each containing at least one memory chip and with each including means for storing one of program data and variable data;
   housing means containing a plurality of electronic components of said calculator and having an insertion portion adapted for accommodating said plurality of memory package means;
   data processing means provided in said housing means for performing at least an arithmetic operation and connected to said plurality of memory package means inserted in said housing means;
   input means provided in said housing means and connected to said data processing means for inputting said program data and variable data into said plurality of memory package means inserted in said housing means;
   first memory means for storing data related to memory capacity of at least one of said plurality of package means inserted in said housing means;
   second memory means for storing data which indicates memory capacity of another of said plurality of memory package means inserted in said housing means to replace said one of said plurality of memory package means;
   calculating means for calculating a difference between the dat stored in said first memory means and the data stored in said second memory means;
   means for renewing absolute address data of said another of the plurality of memory package means inserted in said housing means in accordance with said difference calculated by said calculating means.

2. A calculator according to claim 1, whrein each of said plurality of memory package means has a card-like shape and comprises a random-access memory as a memory element, and a power supply means for backing up said memory element.

3. A calculator according to claim 1, wherein said data processing means further includes:
   detecting means for detecting whether or not a memory package means is inserted in said housing means; and
   alarm means for generating an alarm according to the detection result of said detecting means.

4. A calculator according to claim 3, wherein said data processing means further includes check means for checking, when said detecting means detects that memory package means is inserted in said housing means, whether or not a storing state in said memory package means is normal;
   whereby said alarm means generates an alarm according to the check result of said check means.

5. A calculator according to claim 4, wherein said memory package means includes a data area adapted for storing said program and variable data, and an administration area adapted for storing an address which indicates an end of location in said data area storing said program and variable data; and
   said check means includes search means for searching for an address which indicates an end of location in said data area storing said program and variable data, and means for comparing said address searched by said searching means with said address stored in said administration area.

6. A calculator according to claim 1, wherein said data processing means includes:
   first selection means for selecting at least one memory package means from said plurality of memory package means loaded into said housing means for storing the program data as a first group;
   second selection means for selecting at least one other memory package means, for storing the variable data as a second group; and
   writing means for writing each of said program and variable data input by said output means into said respective memory package means selected by one of said first and second selection means.

7. A calculator according to claim 6, wherein said first selection means includes first addressing means for addressing the memory package means of said first group sequentially from an upper address; and
   said second selection means includes a second addressing means for addressing the memory package means of said second group sequentially from a lower address.

8. A calculator according to claim 7, which further includes judging means for judging whether or not setting of said program data stored in said memory package means of said first group and said variable data stored in said memory package means of said second group is correct, and wherein said judging means includes:

first latch means for storing an address which indicates an end of location in said memory package means of said first group storing said program data;

second latch means for storing an address which indicates an end of location in said memory package means of said second group storing said variable data; and comparing means for comparing an address stored in said first latch means with an address stored in said second latch means;

whereby an alarm means generates an alarm according to the judgment result of said judging means.

* * * * *